Dec. 18, 1956   IKU YOSANO   2,774,954
ATTITUDE COMPENSATED ECHO SOUNDING DEVICE
Filed May 22, 1952.   2 Sheets-Sheet 1

Inventor
I. YOSANO
By R. P. Morris
Attorney

United States Patent Office 2,774,954
Patented Dec. 18, 1956

2,774,954
ATTITUDE COMPENSATED ECHO SOUNDING DEVICE

Iku Yosano, Minato-ku, Tokyo, Japan, assignor to International Standard Electric Corporation, New York, N. Y., a corporation of Delaware Application May 22, 1952, Serial No. 289,305

Claims priority, application Japan May 24, 1951

5 Claims. (Cl. 340—3)

This invention relates generally to improvements in echo sounding devices.

A primary object of the invention resides in the provision of an improved echo sounding device which automatically compensates for movement of the vessel in which it is carried due to such factors as variations in pitch and roll.

An important object of the invention is to provide in an echo sounding device, means for compensating the normal variation in the distance between the fathometer and the bottom of the body of water being charted, such variations being introduced by the above mentioned factors.

A still further object of the invention is to incorporate within an echo sounding device of the type wherein a sonic or other type of wave is initiated for the purpose of measuring the time of travel through fluid, if reflected, means for advancing and delaying the instant of wave initiation as a function of the relative position assumed by the vessel at any one moment.

Other objects and advantages are generally to improve and simplify the construction of echo sounding devices for the reasons above stated, while still further objects will readily become apparent to persons skilled in the art upon an examination of the drawings, the specification and the claims appended thereto.

In the drawings in which like parts are identified by the same reference numerals;

Figure 4:
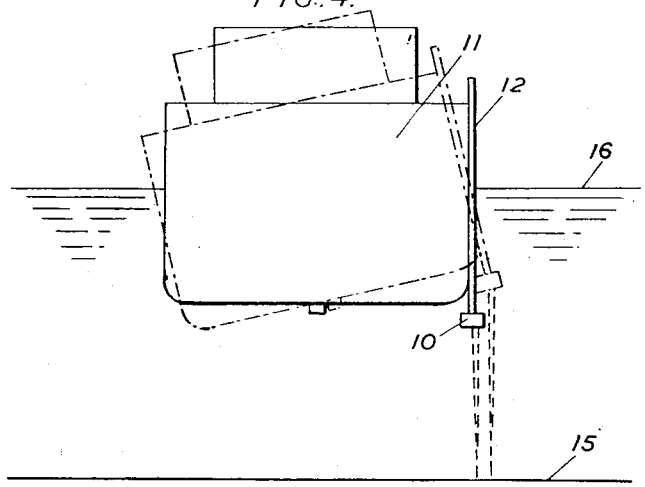
Fig. 4 illustrates in a simple fashion the vessel roll which is one source of errors heretofore introduced in echo sounding devices of known type.

Echo sounding devices generally operate on the relatively simple principle of emitting an acoustic wave from a transmitter positioned below the surface of the water and in contact therewith to the bottom of the harbor or the like being sounded for reflection upwardly to a receiver or detector to permit the delay time between the instant of transmission and the instant of reception to be measured as indicative of the depth of water. As is apparent from an examination of Fig. 4, and assuming that an echo sounding device 10 is fixedly attached to the hull of a vessel 11 by means of a mounting rod 12 or the like, an accurate reading of the distance to bottom 15 below surface 16 is obtained only when the vessel is on an even keel, a condition which seldom obtains in navigation. When hull 11, illustrated in heavy lines, assumes a list to port as shown in dotted lines, device 10 likewise moves from the heavy to the dotted line position at which time the recording will indicate a different depth than is recorded when in the heavy line position. While this source of error is perhaps unimportant when taking deep soundings, the percentage of error increases progressively as the vessel moves into increasingly shallow water and such errors are a factor to be reckoned with. The safety of the ship is dependent upon not only true readings at any given instance, but on an accurate recording of the character of the bottom of a river, harbor or the like, since the navigator will proceed with more caution through shallow waters covering a rocky bottom than through the same waters covering a smooth sandy bottom. A troublesome feature of the prior art echo sounding devices has been the inability thereof accurately to depict not only the true depth of the water but also to depict the exact character of the bottom being measured.

Figure 1:
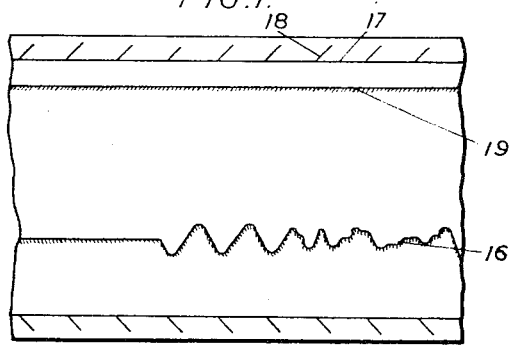
Fig. 1 illustrates a recording tape of the type employed by prior art echo sounding devices and illustrating thereon the depth reading.
Figure 2:
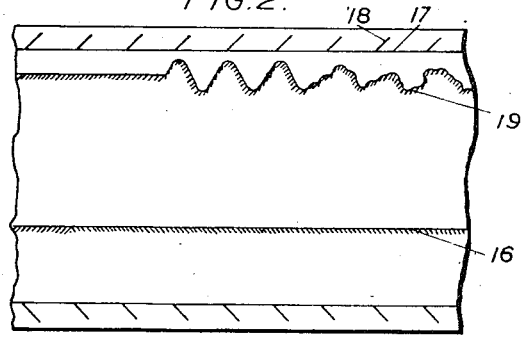
Fig. 2 is a comparative illustration of the same general type of recording tape and illustrating the results of the present invention.

Referring to Fig. 1, the conventional type of recording tape shown includes a standard zero line 17 divided by time lines 18 with the transmitter-recording line shown at 19 and the receiving-recording line at 16. The distance between lines 19 and 16 is indicative of the measurement from the surface to the bottom of the water and the distance between the standard zero line 17 and the receiving-recording line 16 represents the depth to which the echo sounding device is submerged. That portion of the record shown at the left hand side represents the condition wherein the vessel is on an even keel with no variables introduced by pitch or roll factors, showing accurately the true depth, while that portion of line 16 through the center and right hand sides of the tape represents a normal depth reading which has been taken under more realistic conditions of navigation wherein the vessel is in constant motion of the type introduced by pitch and roll, for example. Since the vessel movement is highly irregular and hence is not always represented by geometric configurations such as a sine wave, it becomes very difficult to distinguish the irregularities appearing on the tape which result from a rough bottom from those introduced solely by the movement of the vessel.

Figure 3:
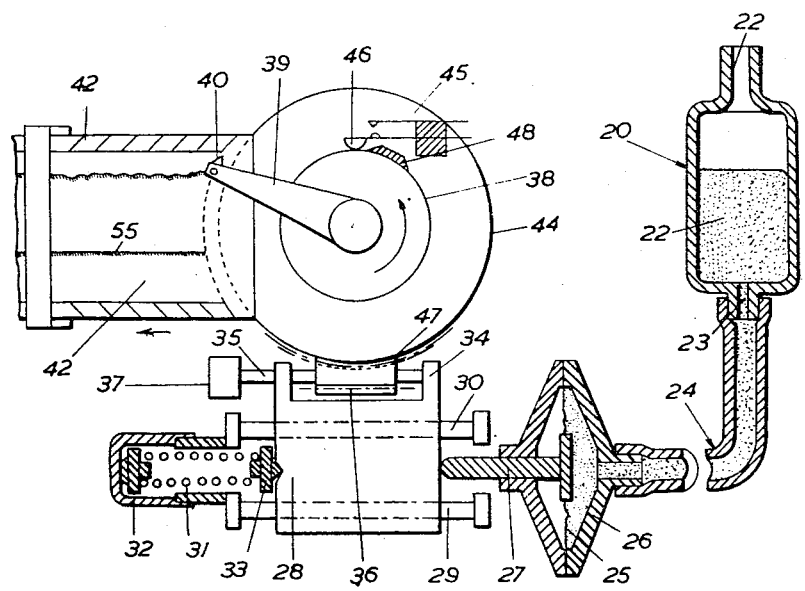
Fig. 3 is an elevational view, partially sectionalized, of an echo sounding device with the principles of the present invention incorporated therein.

The present invention has been found particularly effective in eliminating the guess work which has heretofore been attendant the reading of echo sounding device charts, especially in shallow water, the principles of the invention being shown for illustrative purposes in the device of Fig. 3. The vessel displacement is detected by an inclination detector such as a pendulum or hydraulic pressure equipment with the instant of impulse generation controlled in accordance with the corresponding detected vessel movement for the purpose of maintaining constant the time of travel of the wave from a transmitter to a receiver for a given depth. This object has been accomplished by means of advancing or retarding the time of impulse generation by an amount corresponding to the vertical offset of the echo sounder transmitter and receiver from an even keel condition.

Considering in detail the device of Fig. 3, vessel 20 open to the atmosphere at 21 contains a quantity of mercury or the like 22, the container 20 being positioned upright to allow passage of mercury 22 through an opening 23 in the bottom thereof and downwardly through a tubular conduit 24 which leads in any suitable manner to one side of a pressure operated diaphragm 25 within a housing 26, diaphragm 25 carrying a slidably mounted plunger 27 for actuation of a slidably mounted carriage 28 in response to variations of head pressure of the mercury, container 20 being spaced substantially from the pressure responsive apparatus 26 on the vessel carrying the echo sounding device. Carriage 28 is slidably mounted on rods 29 and 30, the carriage being normally biased toward plunger 27 by a compression spring 31 contained in suitable housing 32 and contacting carriage 28 at 33. The tension on spring 31 may be adjustable in the known manner normally to counteract the head pressure of mercury 22 with carriage 28 midway between the stopped ends of guide rods 29 and 30. Variations in head pressure due to change in the relative position between container 20 and the remotely spaced pressure responsive mechanism 26 effect a corresponding movement of carriage 28 toward and away from spring 31 depending on whether the pressure is increasing or decreasing. Carriage 28 includes bracket like portion 34 between which is mounted a shaft 25 in journaled relation thereto, shaft 35 carrying a worm gear 36, with one end of the shaft extending laterally of bracket 34 and having mounted thereon a control knob 37.

The structure shown above the gear 36 and operatively associated therewith includes a rotatably mounted drum 38, constantly driven by a mechanism not shown. A recording arm 39 provided with a stylus 40 is fixed to drum 38 for rotation therewith, and passes over the surface of tape 41 during each revolution of the drum, tape 41 being mounted on suitable carrier 42 for movement to the left at constant speed by a mechanism not shown.

A disk 44, mounted concentric with drum 38, but not driven thereby, serves as a mounting base for a switch, generically designated 45, and including a pair of contacts one of which carries a cam follower 46. At least a portion of disk 44 is provided with peripheral teeth illustrated at 47 adapted to mesh with gear 36. Teeth 47 are of a suitable type whereby axial movement of carriage 28 along guide rods 29 and 30 operates through gear 36 to rotate disk 44 an amount proportional to the displacement of carriage 28, thereby changing the relative position of switch 45 in respect to a cam lobe 48 mounted on drum 38.

During each rotation of drum 38 in a counterclockwise direction, as indicated by the arrow, stylus 40 of arm 39 assumes the position shown over tape 41 prior to contact between cam lobe 48 and cam follower 46, the cam lobe being shown in a position just prior to the camming of switch 45 closed by further rotation of drum 38. Since as mentioned in respect to the tape of Fig. 1, the upper line or graph 19, Fig. 1, indicates the time of signal transmission, the corresponding line 51 of Fig. 3 may be electrically etched on the tape in a well known manner by applying an electric potential to arm 39 concurrently with the closing of switch 45, causing a spark to pass through tape 41 to metallic carrier 42. The closing of switch 45 also controls the instant of signal emission and thus it is seen that variations in liquid pressure exerted on diaphragm 25 are employed to vary the instant of signal transmission as a function of pressure variations introduced by ship movement.

In actual practice, the mercury containing vessel 20 is spaced athwartship of the echo sounding device mechanism illustrated to the left of Fig. 3 with the vessel 20 sufficiently above the normal level of pressure responsive mechanism to insure a substantial amount of pressure variation on diaphragm 25 by ship's roll and other movements. It becomes equally apparent that the effect of pitch may be minimized by locating the components of the device substantially amidships.

Suitable adjustment of the standard time base line 51 vertically on tape 41 is obtained by manual rotation of knob 37. Since the pressure responsive portion of the device shown to the left of Fig. 3 serves as a mechanical means for the control of circuitry associated therewith, not shown, but well known in the art, it is apparent that the components of the system may be physically located at quite some distance from an associated sonic transmitter and receiver. The recording on the tape 51 of the line 55 corresponding to receiver-recording line 16 of Fig. 1 may be electrically etched in the manner above mentioned and which is well known in the art, hence will not be described in detail as shown in the drawings. It will be noted, however, that line 55 is of a substantially linear character permitting accurate reading of depth measurement whereas line 51 is of non-linear configuration since that line represents a recording of ship displacement. Irregularities occurring in line 55 indicate the nature of the bottom being measured with error factors heretofore encountered removed therefrom.

As is evident, the device could be so positioned that the mercury vessel 20 is spaced fore and aft from the pressure responsive equipment and thereby the device would indicate pitch instead of roll, hence if it is desired to compensate for both pitch and roll, the units may be mutually spaced diagonally of the ship.

While I have described above the principles of my invention in connection with specific apparatus, it is to be clearly understood that this description is made only by way of example and not as a limitation to the scope of my invention as set forth in the objects thereof and the accompanying claims.

What is claimed is:

1. An echo sounding device adapted for mounting on a vessel or the like comprising a pressure wave transmitter adapted to be completely submerged in a fluid supporting said vessel, means for actuating said transmitter to transmit periodically a signal wave for travel through said fluid and reflection from a surface, means submerged in said fluid for the detection of said reflected signal wave, means for producing a variable pressure related to the extent of displacement movements of said vessel, pressure responsive means, and means associated with said transmitter and controlled by said pressure responsive means for varying the time at which said signal waves are transmitted by such a time period as to compensate for said displacement movements.

2. A device for automatic correction of the effect of vessel displacement from an even keel condition on echo sounding readings, comprising a pressure operable mechanism including a diaphragm and a member cooperatively connected therewith for movement in response to pressure variations on said diaphragm, a pressure responsive system including a container of liquid spaced from and above the level of said diaphragm and connected to said diaphragm by an elongate conduit for transmission of fluid pressure changes thereto, a slidably mounted carriage positioned with respect to said member for displacement to and fro in response to movement of said member in response to changes in liquid pressure within said system, a rotatable cam member adapted to be rotated at a constant speed, a cam follower member mounted for oscillatory movement through a path concentric to said cam member, signal transmitter contacts mounted on said cam follower member in such position as to be actuated by said cam member once during each rotation of the latter, and means cooperatively connecting said cam follower member and said carriage for the transmission of pressure initiated carriage movements to said cam follower member for advancing or retarding the time at which said cam member actuates said contacts.

3. The device of claim 2 wherein said rotatably driven cam member has fixedly attached thereto a radially extended stylus arm, means for continuously drawing a recording tape beneath a portion of said arm, and means associated with said cam follower member and said arm for recording the stylus position on said tape at the moment of contact between said cam and said cam follower.

4. The device of claim 2 including means associated with said rotatably driven cam member for recording the relative position thereof upon the actuation of said contacts.

5. In a device of the character described, the subcombination including a rotatably mounted member provided with a cam lobe, a second member mounted for concentric oscillatory movement in respect to said first member and carrying a cam follower in a position to be actuated by said cam lobe during rotation of said first member, a slidably mounted carriage, a pressure responsive member associated with said carriage for the movement thereof in one direction, means biasing said carriage toward said pressure responsive member, means cooperatively connecting said carriage to said second member for the translation of linear movement of said carriage to oscillatory movement of said second member, and means including a pressure responsive system associated with said pressure responsive member but spaced therefrom for actuation thereof in response to pressure changes within said system.

References Cited in the file of this patent

UNITED STATES PATENTS

| | | |
|---|---|---|
| 1,636,502 | Fessenden | July 19, 1927 |
| 2,350,994 | Anderson | June 13, 1944 |
| 2,394,286 | Blaisdell | Feb. 5, 1946 |
| 2,477,050 | Dyson | July 26, 1949 |
| 2,615,940 | Williams | Oct. 28, 1952 |

FOREIGN PATENTS

| | | |
|---|---|---|
| 5,547 | Australia | Dec. 28, 1932 |